(12) United States Patent
Xiao et al.

(10) Patent No.: US 11,451,295 B2
(45) Date of Patent: Sep. 20, 2022

(54) OPTICAL LINK FAULT IDENTIFICATION METHOD, APPARATUS AND SYSTEM

(71) Applicant: HUAWEI TECHNOLOGIES CO., LTD., Guangdong (CN)

(72) Inventors: Xin Xiao, Nanjing (CN); Zhao Zhang, Dongguan (CN); Jian Li, Shenzhen (CN); Yunpeng Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/176,083

(22) Filed: Feb. 15, 2021

(65) Prior Publication Data

US 2021/0167851 A1 Jun. 3, 2021

Related U.S. Application Data

(63) Continuation of application No. PCT/CN2019/099908, filed on Aug. 9, 2019.

(30) Foreign Application Priority Data

Aug. 16, 2018 (CN) .......................... 201810934567.4

(51) Int. Cl.
*H04B 10/079* (2013.01)
*H04B 10/25* (2013.01)
(Continued)

(52) U.S. Cl.
CPC ... *H04B 10/0791* (2013.01); *H04B 10/07955* (2013.01); *H04B 10/25* (2013.01); *H04B 10/50* (2013.01); *H04B 10/69* (2013.01)

(58) Field of Classification Search
CPC .......... H04B 10/0791; H04B 10/07955; H04B 10/25; H04B 10/50; H04B 10/69; H04B 10/0775; H04B 10/0771; H04B 10/0795
(Continued)

(56) References Cited

U.S. PATENT DOCUMENTS 10,404,362 B1 * 9/2019 Xu ..................... H04B 10/0791
10,970,395 B1 * 4/2021 Bansal ................. G06F 21/566
(Continued)

FOREIGN PATENT DOCUMENTS

CN  101291176 A  10/2008
CN  101753207 A  6/2010
(Continued)

OTHER PUBLICATIONS

Lou Shu Mei et al., Application of Neural Network Technology in Optical Fiber Fault Early Warning System Simulation, Computer Simulation, Issue 12, Dec. 2012, With an English Abstract, total 4 pages.

*Primary Examiner* — Abbas H Alagheband
(74) *Attorney, Agent, or Firm* — Leydig, Voit & Mayer, Ltd.

(57) ABSTRACT

This application provides an optical link fault identification method, and relate to the field of communications technologies. The method includes: obtaining performance data of a network device, extracting a feature parameter of the performance data, and identifying a fault mode on an optical link based on the feature parameter. The method resolves problems of a difficulty in fault identification and slow troubleshooting that are caused by a large quantity of devices, many line faults, and a difficulty in obtaining manual troubleshooting cases. In addition, a fault can be quickly identified when the fault occurs, improving troubleshooting efficiency. When an optical link risk does not cause a fault, deterioration of the performance data can be found in advance based on a feature, to perform identification and warning.

14 Claims, 7 Drawing Sheets

(51) Int. Cl.
    *H04B 10/50*     (2013.01)
    *H04B 10/69*     (2013.01)

(58) Field of Classification Search
    USPC .......................................................... 398/13
    See application file for complete search history.

(56) References Cited

U.S. PATENT DOCUMENTS

| | | | |
|---|---|---|---|
| 2001/0026385 A1* | 10/2001 | Cao | H04B 10/07955 398/79 |
| 2003/0167149 A1* | 9/2003 | Simon | A61B 5/165 702/182 |
| 2004/0096214 A1* | 5/2004 | Morreale | H04B 10/0775 398/33 |
| 2005/0220387 A1* | 10/2005 | Asahi | H04B 10/0777 385/4 |
| 2007/0140688 A1* | 6/2007 | Patel | H04L 43/50 398/5 |
| 2007/0201867 A1 | 8/2007 | Delew et al. | |
| 2009/0010643 A1* | 1/2009 | DeLew | H04B 10/035 398/17 |
| 2012/0019366 A1* | 1/2012 | Aguren | H04B 10/07 340/10.1 |
| 2017/0033862 A1* | 2/2017 | Dupuis | H04B 10/03 |
| 2017/0046215 A1* | 2/2017 | Hasegawa | G06F 11/079 |
| 2018/0172552 A1 | 6/2018 | Adam et al. | |
| 2019/0377625 A1* | 12/2019 | Chintalapati | G06N 7/005 |
| 2021/0089927 A9* | 3/2021 | Ryan | G06F 11/0754 |

FOREIGN PATENT DOCUMENTS

| | | |
|---|---|---|
| CN | 103312411 A | 9/2013 |
| CN | 104331635 A | 2/2015 |
| CN | 104935378 A | 9/2015 |
| CN | 105530046 A | 4/2016 |
| CN | 106059661 A | 10/2016 |
| JP | 2017507509 A | 3/2017 |
| KR | 20140007003 A | 1/2014 |
| WO | 2017161963 A1 | 9/2017 |

\* cited by examiner (a)

(b)

OPTICAL LINK FAULT IDENTIFICATION METHOD, APPARATUS AND SYSTEM

CROSS-REFERENCE TO RELATED APPLICATIONS

This application is a continuation of International Application No. PCT/CN2019/099908, filed on Aug. 9, 2019, which claims priority to Chinese Patent Application No. 201810934567.4, filed on Aug. 16, 2018. The disclosures of the aforementioned applications are hereby incorporated by reference in their entireties.

TECHNICAL FIELD

This application relates to the field of communications technologies, and in particular, to an optical link fault identification method, apparatus, and system.

BACKGROUND

As complexity and a transmission capacity of a network system increase, optical fiber communication has become a main wired communication mode thanks to advantages such as a large transmission capacity and high confidentiality of optical fiber communication. However, because glass is generally used by an optical fiber as a waveguide, the optical fiber is brittle and has poor mechanical strength. As a result, the optical fiber may be bent or broken during use. In addition, to reduce costs, an optical fiber connector is usually used for connection between optical fibers. However, the optical fiber connector may be loosened after being used for connection for a long time, and the connection may be excessively loose, or other phenomena may occur. As a result, a proportion of optical link faults in optical fiber communication increases, reliability of an optical link is reduced, and user experience is worsened. In this case, the faults need be rectified in a timely manner to maintain the reliability of the optical link.

Current network system operation and maintenance usually rely on a conventional alert system to ensure that a fault is rectified in a timely manner. However, in the conventional alert system, a threshold alert system is established for performance data of an optical link network device or a service, and a reference threshold is compared with a performance data indicator of the optical link network device or the service in an observation system, to monitor whether a minimum working requirement is met. If the minimum working requirement is not met, an alert prompt is sent, so that a fault is rectified in a timely manner to maintain reliability of the optical link. The network system is complex, there are a quite large quantity of alert prompts in the network system, and a large quantity of other problems exist in the alert prompts. Therefore, network operation and maintenance personnel can neither obtain effective alert information from only the alert prompts nor obtain an accurate fault mode from the alert prompts, and faults can only be troubleshot manually. However, manual troubleshooting has low efficiency and an excessively large delay in fault rectification. As a result, users are affected for a long time and operations are complex. In addition, a missed alert or a false alert is prone to occur because determining is performed by using performance data of the network device and service at a single time point and a manually specified baseline threshold; consequently, accuracy is low.

SUMMARY

Embodiments of the present invention provide an optical link fault identification method. During operation and maintenance of a network system on an optical link network, for example, low fault handling efficiency and an excessively long fault rectification delay are caused by low effectiveness of an alert prompt and a failure to obtain an accurate fault mode from the alert prompt, users are affected for a long time, and operations are complex. The method resolves these problems. A feature parameter of performance data is extracted, and the feature parameter is used to identify a fault mode, so that a fault mode can be accurately identified without manually setting an alert threshold, improving fault processing efficiency and simplifying a user operation.

To achieve the foregoing objective, the following technical solutions are used in this application.

According to a first aspect, an optical link fault identification method is provided, including: obtaining performance data of a network device on an optical link that comprises at least receive optical power, extracting a feature parameter used to indicate a change of the performance data that is within a preset time window, and identifying a fault mode on the optical link based on the feature parameter, wherein the performance data is a time sequence within the preset time window.

In a possible implementation, the performance data further includes transmit optical power and/or an optical fiber length.

In a possible implementation, the feature parameter includes a feature parameter used to represent an abnormality level of the performance data and/or a feature parameter used to represent a change trend of the performance data.

In a possible implementation, the feature parameter used to represent the abnormality level of the performance data includes one or any combination of the following parameters:

a jitter level that is a level of a random change of the receive optical power within the preset time window;

a weak-light ratio that is a ratio of duration of weak light in the receive optical power to total duration of the preset time window;

a strong-light ratio that is a ratio of duration of strong light in the receive optical power to total duration of the preset time window; and a no-light ratio that is a ratio of duration of no light in the receive optical power to the total duration of the preset time window.

In a possible implementation, the parameter used to represent the change trend of the performance data includes one or any combination of the following parameters:

a bounce count, used to represent a fluctuation count of a fitting processing result of the receive optical power;

a deterioration level, used to represent a drop trend of the fitting processing result of the receive optical power;

a rise count, used to represent a rise trend of the fitting processing result of the receive optical power; and a sudden change count, used to represent a quantity of times the receive optical power deviates from historical average optical power within the preset time window.

In a possible implementation, the identifying a fault mode on the optical link based on the feature parameter specifically includes:

matching the feature parameter against a fault mode identification model to determine the fault mode.

In a possible implementation, the method further includes:

training, by using historical data of a known fault mode, the fault mode identification model that is corresponding to a feature parameter and a fault mode, where the historical data includes a feature parameter and a fault mode corresponding to the feature parameter.

In a possible implementation, after the identifying a fault mode based on the feature parameter, the method further includes:

comparing the identified fault mode with an actual fault mode corresponding to the feature parameter, and if the identified fault mode is inconsistent with the actual fault mode, adding the feature parameter and the actual fault mode corresponding to the feature parameter to the training set.

In a possible implementation, after the adding the feature parameter and the actual fault mode corresponding to the feature parameter to the training set, the method further includes: training the training set to establish a new fault mode identification model, where the training set consists of the historical data used to train the fault mode identification model, the added feature parameter, and the added actual fault mode corresponding to the feature parameter.

According to another aspect, an optical link fault identification apparatus is further provided, including: an obtaining unit, configured to obtain performance data of a network device on an optical link that includes at least receive optical power, where the performance data obtained by the obtaining unit is a time sequence within the preset time window; an extraction unit, configured to extract a feature parameter indicating a change of the performance data obtained by the obtaining unit within the preset time window; and an identification unit, configured to identify a fault mode on the optical link based on the feature parameter extracted by the extraction unit.

In a possible implementation, the performance data obtained by the obtaining unit further includes transmit optical power and/or an optical fiber length.

In a possible implementation, the feature parameter extracted by the extraction unit includes a feature parameter used to represent an abnormality level of the performance data and/or a feature parameter used to represent a change trend of the performance data.

In a possible implementation, the identification unit includes a matching module and an output module, where the matching module is configured to match the feature parameter extracted by the extraction unit against a fault mode identification model to determine the fault mode; and the output module is configured to output the fault mode determined by the matching module to an external optical network device.

In a possible implementation, the apparatus further includes: a training unit, configured to train, by using historical data of a known fault mode, the fault mode identification model that is corresponding to the feature parameter and the fault mode, where the historical data includes the feature parameter and the fault mode corresponding to the feature parameter.

In a possible implementation, the apparatus further includes a comparison unit and an addition unit, where the comparison unit is configured to: compare the fault mode identified by the identification unit with an actual fault mode corresponding to the feature parameter, and output a comparison result to the addition unit; and the addition unit is configured to: receive the output result from the comparison unit, and when the fault mode identified by the identification unit is inconsistent with the actual fault mode corresponding to the feature parameter, add the feature parameter and the actual fault mode corresponding to the feature parameter to the training set.

In a possible implementation, the apparatus further includes an establishment unit, configured to train the training set to establish a new fault mode identification model, where the training set consists of the historical data used to train the fault mode identification model, the added feature parameter, and the added actual fault mode corresponding to the feature parameter.

According to another aspect, an optical link fault identification system, including an optical link network device and an online big-data analysis platform, where the online big-data analysis platform is provided with the apparatus according to claims 10 to 16, and receives performance data that is uploaded by the optical link network device and that includes at least receive optical power.

BRIEF DESCRIPTION OF DRAWINGS

To describe the technical solutions in the embodiments of this application more clearly, the following briefly describes the accompanying drawings required for describing the embodiments of this application. It is clearly that the accompanying drawings in the following description show merely some embodiments of this application, and a person of ordinary skill in the art may still derive other drawings from these accompanying drawings without creative efforts.

DESCRIPTION OF EMBODIMENTS

The following clearly describes the technical solutions in the embodiments of this application with reference to the accompanying drawings in the embodiments of this application. The described embodiments are some but not all of the embodiments of this application. All other embodiments obtained by a person of ordinary skill in the art based on the embodiments of this application without creative efforts shall fall within the protection scope of this disclosure.

The term "and/or" in this specification describes only an association relationship for describing associated objects and represents that three relationships may exist. For example, A and/or B may represent the following three cases: Only A exists, both A and B exist, and only B exists.

In the specification and claims of this disclosure, the terms "first", "second", and so on are intended to distinguish between different objects but do not indicate a particular order of the objects. For example, a first target object, a second target object, and the like are used to distinguish between different target objects, rather than describe a specific order of the target objects.

In addition, in the embodiments of this application, the word "for example" or "example" is used to represent giving an example, an illustration, or a description. Any embodiment or design scheme described as "for example" or "example" in the embodiments of this application should not be explained as being more preferred or having more advantages than another embodiment or design scheme. Exactly, use of the word such as "for example" or "example" is intended to present a relative concept in a specific manner.

In the description of the embodiments of this application, unless otherwise stated, "a plurality of" means at least two. For example, a plurality of processing units are at least two processing units, and a plurality of systems are at least two systems.

The following describes technical solutions of this application with reference to accompanying drawings.

Currently, optical fiber communication is a type of wired communication. Compared with spread spectrum communication and satellite communication, optical fiber communication has a large communication capacity, a long transmission distance, small attenuation, a small size, and high anti-interference performance, is easy for capacity expansion, and can save a large quantity of non-ferrous metal resources. For example, a potential bandwidth of an optical fiber in optical fiber communication can be up to 20 THz.

In an optical fiber communications system, an optical link includes an optical transmitter, an optical fiber, an optical receiver, and other necessary optical components. A principle of the optical link is to implement internetworking by using an optical method, to obtain an optical interconnect network of various different topology structures. The optical link transmits a sound, an image, and a data signal by using an optical fiber communications technology.

Figure 1:
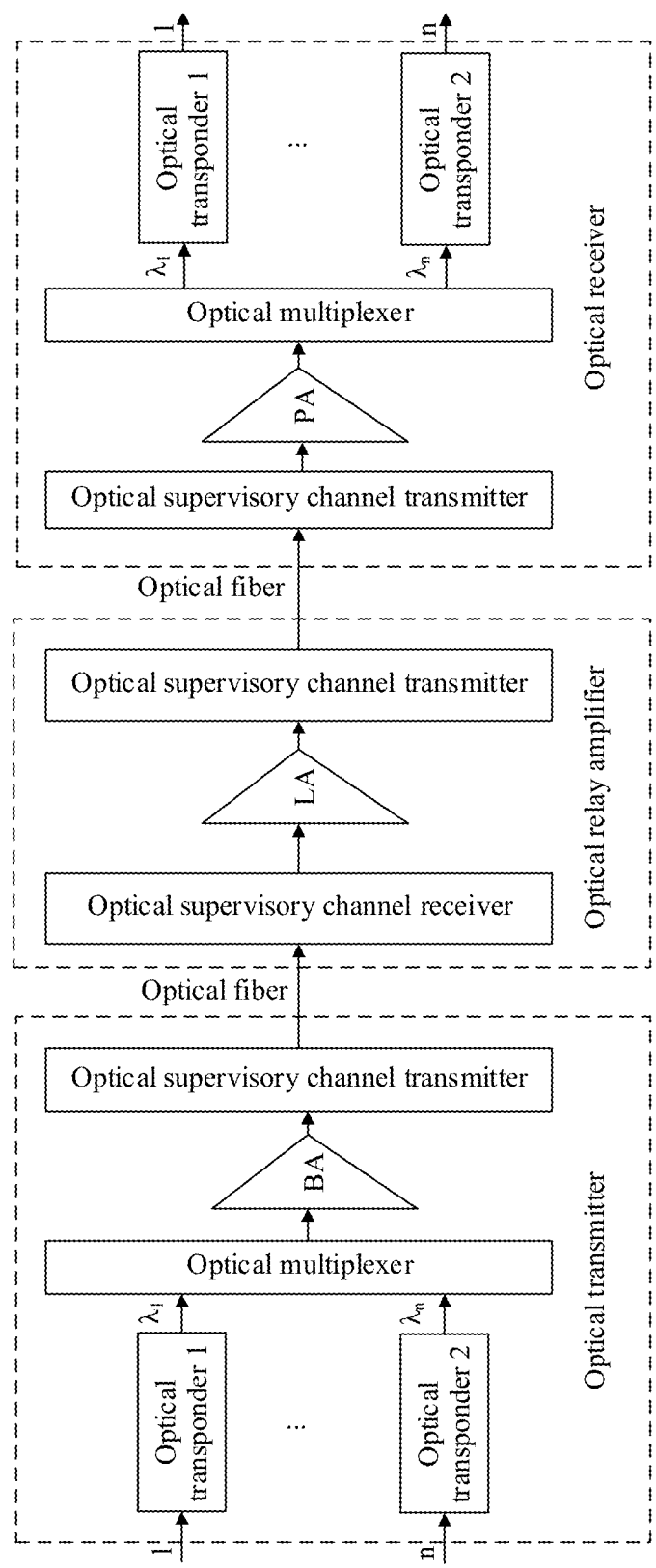
FIG. 1 is an example of a schematic structural diagram of an optical link in an optical fiber communications system.

FIG. 1 is a schematic structural diagram of an optical link in an optical fiber communications system. As shown in FIG. 1, the optical link includes an optical transmitter, an optical relay amplifier, an optical receiver, and several joint fibers. The optical transmitter includes N optical transponders, an optical multiplexer, a booster amplifier (BA), and an optical supervisory channel transmitter. The N optical transponders are configured to receive N light waves, and all of the optical transponders have an optical-to-electrical conversion element and a signal processing element or block. The optical multiplexer is configured to multiplex N optical signals having different wavelengths into one optical fiber for transmission. The BA is configured to perform power boosting and transmission of the N multiplexed signals with the different wavelengths. The optical supervisory channel transmitter is configured to monitor a transmission status of each channel in the system and send a signal. The optical relay amplifier includes an optical supervisory channel receiver, a line amplifier (LA), and an optical supervisory channel transmitter. The optical supervisory channel receiver is configured to monitor a transmission status of each channel in the system and receive a signal. The LA is configured to periodically compensate for a line transmission loss. The optical supervisory channel transmitter has the same function as the optical supervisory channel transmitter in the optical transmitter. The optical receiver includes an optical supervisory channel receiver, a pre-amplifier (PA), an optical demultiplexer, and N optical receive sides. A function of the optical supervisory channel receiver is consistent with a function of the optical supervisory channel receiver in the optical relay amplification. The PA is configured to amplify a signal, to improve sensitivity of the receiver (for example, when an optical signal noise ratio (OSNR) meets a requirement (a comparatively small noise figure is required), relatively high input power may suppress noise of the receiver itself, to improve receiving sensitivity). The optical demultiplexer is configured to spatially separate a plurality of optical signals in different segments based on light intensity and wavelength. The N optical receive sides are configured to receive split optical signals with N wavelengths. The optical fiber is configured to connect the optical transmitter to an optical relay meter, and the optical relay meter is connected to an optical receiver to form the optical link.

It should be noted that the optical link structure should be understood as an example of an implementation of an optical link structure in the optical fiber communications system, instead of limiting the optical link structure in the optical fiber communications system.

In the foregoing description, the optical fiber is used as a transmission medium because the optical fiber generally uses glass as a waveguide to transmit information from one end to the other end in the form of light. In addition, the low-loss glass optical fiber is almost not limited by bandwidth, making the optical fiber become a convenient transmission tool. In addition, as a transmission tool, the optical fiber has various advantages. For example, the optical fiber has high sensitivity, and is not interfered with by electromagnetic noise; is small-sized, lightweight, long-lived, and low-priced; has insulation, high-voltage resistance, high-temperature resistance, corrosion resistance, and is suitable for special working environment; has a geometric shape that can be adjusted depending on environment requirements, and facilitates signal transmission; has high bandwidth, a large communication capacity, small attenuation, and large transmission coverage; is low in crosstalk and high in transmission quality, and has high confidentiality; and facilitates laying and movement of raw materials. However, the optical fiber uses glass as a waveguide, and consequently, the optical fiber is brittle and has poor mechanical strength. As a result, the optical fiber may be bent or broken during use. In addition, to reduce costs, an optical fiber connector is usually used for a connection between optical fibers. However, when the optical fiber connector is used for connection for a long time, a phenomenon such as loose joint or an excessively loose connection may occur, causing a fault on the optical link.

It should be noted that each component element in the network system except the optical fiber may be simply understood as a device in a network.

Specifically, the network device on the optical link may be an optical line terminal (OLT), an optical network unit (ONU), or the like. The OLT is a network device connected to a plurality of ONUs by using an optical distribution network that consists of a passive optical cable, an optical splitter/combiner, and the like.

It should be understood that the network device on the optical link may be a hardware device or the like that has a transmission function and can execute a software program, and is not merely the foregoing listed device or terminal.

This application provides an optical link fault identification method. The method may be applied to an OLT and an ONU, or may be applied to an online big-data analysis platform. In the method, a fault on an optical link is identified by obtaining and analyzing performance data of a network device on the optical link. First, the performance data of the network device that includes at least receive optical power is obtained. Then a feature parameter used to indicate the performance data that is within a preset time window is extracted. Finally, a fault mode is identified based on the feature parameter.

Figure 2:
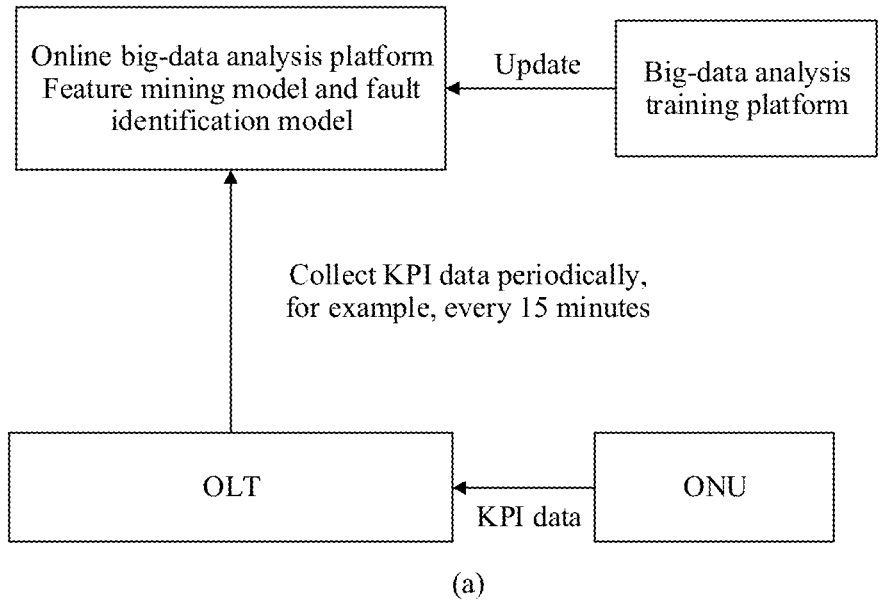
FIG. 2 is a schematic diagram of an application scenario a according to an embodiment of this application.
Figure 3:
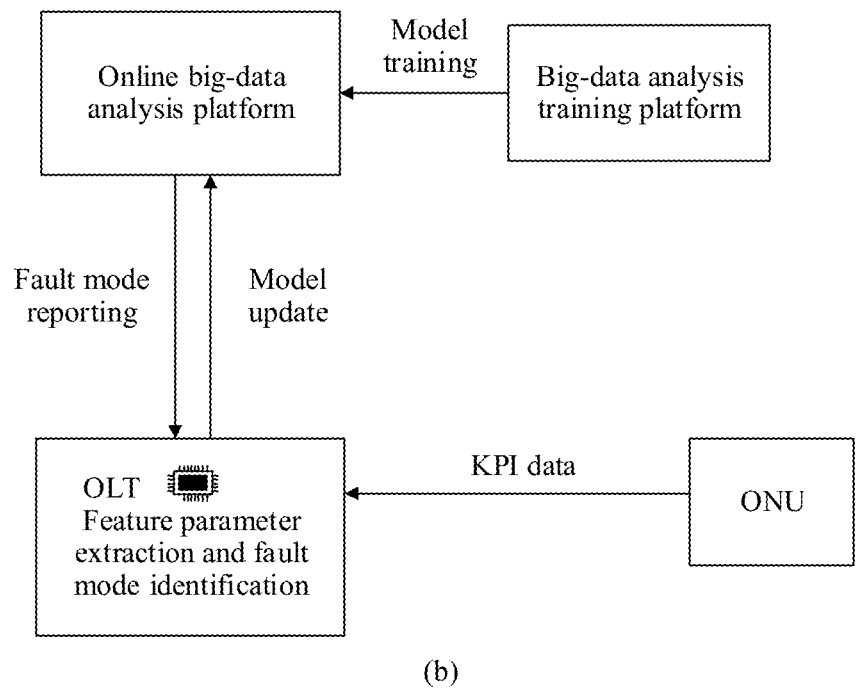
FIG. 3 is a schematic diagram of an application scenario b according to an embodiment of this application.

An optical link fault identification apparatus on an optical link also has different functions, performance, reliability, and the like based on different connection positions and different chips and different software programs that are carried in a network device. For example, as shown in FIG. 3, the OLT carries a feature parameter extraction model and a fault mode identification model, so that the OLT can extract a feature parameter and identify a fault mode. As shown in FIG. 2, a feature parameter extraction model and a fault mode identification model are disposed on an online big-data analysis platform. In this case, the online big-data analysis platform extracts a feature parameter and identifies a fault mode, and the OLT obtains and uploads performance data.

Specifically, as shown in FIG. 2, in a scenario (a), the ONU transmits KPI (key performance indicator) data to the OLT; the online big-data analysis platform provided with the feature parameter extraction model and the fault mode identification model periodically collects the KPI data (for example, every 15 minutes) from the OLT; and after obtaining the KPI data, the online big-data analysis platform performs feature parameter extraction on the KPI data by using the feature parameter extraction model or an algorithm or in another manner, to obtain a feature parameter of the KPI data, and then performs fault mode identification based on the feature parameter of the KPI data by using the fault mode identification model, to determine the fault mode on the optical link. As shown in FIG. 3, in a scenario (b), an ONU transmits KPI data to the OLT provided with the feature parameter extraction model and the fault mode identification model; and after obtaining the KPI data, the OLT performs feature extraction on the KPI data by using a feature parameter extraction model or an algorithm or in another manner, to obtain a feature parameter of the KPI data, performs fault mode identification based on the feature parameter of the KPI data by using the fault mode identification model, and reports the identified fault mode to the online big-data analysis platform. It should be noted that in this embodiment, in addition to an extraction manner in the following embodiment, feature parameter extraction may be implemented in a prior-art parameter extraction manner. This is not specifically limited in this embodiment.

In the method, the performance data transmitted on the network device on the optical link is obtained, and the feature parameter of the performance data is extracted, so as to quickly identify a fault mode on the optical link based on the performance feature, and report the identified fault mode. This method resolves problems in a network system, such as a difficulty in determining a status and cause of an optical link fault and low efficiency in identifying a fault mode, that are caused by a large amount of device data, a large quantity of line faults, a difficulty in obtaining related data and a troubleshooting status, and the like. In addition, according to the method, an optical link fault and a cause can be identified accurately in a timely manner without manually configuring an alert threshold, improving troubleshooting efficiency and accuracy and providing an effective implementation method for quickly and accurately identifying an optical link fault.

Figure 4:
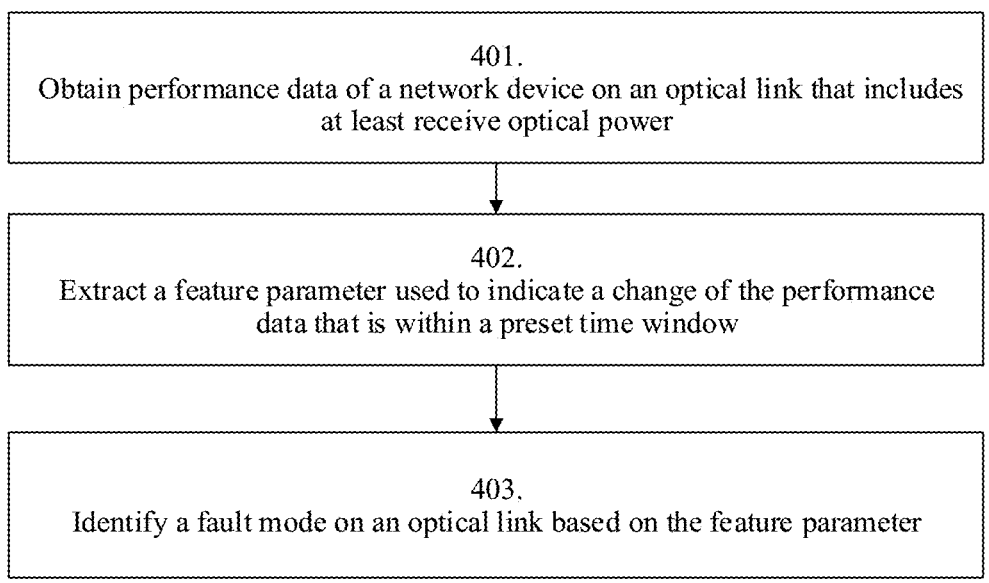
FIG. 4 is a schematic flowchart 1 of implementing an optical link fault identification method according to an embodiment of this application.

FIG. 4 is a schematic flowchart of an optical link fault identification method according to an embodiment of this application. The method includes the following steps.

401. Obtain performance data of a network device on an optical link that includes at least receive optical power.

The performance data in this embodiment should include at least the receive optical power of the optical link network device, and certainly, may alternatively include at least one of transmit optical power of the optical link network device and length data of an optical fiber connected to the optical link network device. Certainly, the performance data may be performance data that needs to be analyzed and that is collected from the optical link network device, or may be short-period KPI data obtained in real time. It should be noted that, in this embodiment, the performance data of the network device is a time sequence that is within a preset time window and that is collected from the network device. The receive optical power included in the performance data may be represented as (time, an optical power value), for example, (2018-01-06:00:00:00, −20 dB) indicating that optical power collected at 00:00:00 on Jan. 6, 2018 is −20 dB.

402. Extract a feature parameter used to indicate a change of the performance data that is within the preset time window.

Specifically, in an embodiment of this application, an algorithm of the feature extraction is extracting the feature parameter by analyzing, by using a big-data technology, the performance data of the network device that is within the preset time window. The feature parameter is used to represent a change status of the performance data of the network device that is within the preset time window. It should be noted that the feature parameter in this embodiment may include a parameter used to represent an abnormality level of the performance data, a parameter used to represent a change trend of the performance data, and/or the like. The parameter used to represent the abnormality level of the performance data includes at least one of a jitter level, a weak-light ratio, a strong-light ratio, and a no-light ratio. The parameter used to represent the change trend of the performance data includes at least one of a bounce count, a deterioration level, a rise count, and a sudden change count. A representation form of the feature parameter is not limited. The feature parameter may be represented by using a table, a graph, or a text. For example, a vector form of the feature parameter may be represented as: feature parameter within a time window=$(x_1, x_2, x_3, x_4, x_5, x_6, x_7, x_8, x_9, \ldots)$, where $x_1$ is the jitter level, $x_2$ is the weak-light ratio, $x_3$ is the strong-light ratio, $x_4$ is the no-light ratio, $x_5$ is the bounce count, $x_6$ is a deterioration count, $x_7$ is the deterioration level, $x_8$ is the rise count, $x_9$ is the sudden change count, and the like.

Meanings of eigenvalues of the feature parameter in this embodiment may be expressed as follows:

The jitter level is a level of a random change of the receive optical power within the preset time window, and is usually represented by an overall standard deviation.

The weak-light ratio is a ratio of duration of weak light in the receive optical power of the network device within the preset time window, to total duration of the preset time window. That is, the weak-light ratio is used to indicate a weak-light rate within the preset time window. Specifically, a weak-light threshold is set to calculate a ratio of a part, within the preset time window, whose optical power value is less than the weak-light threshold and greater than a no-light threshold. For example, if the weak-light threshold is set to −30 dB, optical power values corresponding to 30 time points within a window are less than the weak-light threshold and greater than the no-light threshold, and there are a total of 100 data time points in the window, the weak-light ratio is 0.3.

The strong-light ratio is a ratio of duration of strong light in the receive optical power of the network device within the preset time window, to the total duration of the preset time window. That is, the strong-light ratio is used to indicate a strong-light rate within the preset time window. Specifically, a strong-light threshold is set to calculate a ratio of a part, within the preset time window, whose optical power value is greater than the strong-light threshold. For example, if the strong-light threshold is set to −8 dB, optical power values corresponding to 40 time points within a window are greater than the strong-light threshold, and there are 100 data time points within the window, the strong-light ratio is 0.4.

The no-light ratio is a ratio of duration of no light in the receive optical power of the network device within the preset time window, to the total duration of the preset time window. That is, the no-light ratio is used to indicate a no-light rate within the preset time window. Specifically, a no-light threshold is set to calculate a ratio of a part, within the preset time window, whose optical power value is less than the no-light threshold. For example, if the no-light threshold is set to −35 dB, optical power values corresponding to 50 time points within a window are less than the no-light threshold, and there are 100 data time points within the window, the no-light ratio is 0.5.

It should be noted that a unit of the specified weak-light threshold is a unit of the performance data of the network device. In addition, the specified weak-light threshold, strong-light threshold, and no-light threshold are only examples.

In this embodiment, when the change trend of the performance data is analyzed, fitting processing needs to be performed on the receive optical power of the network device, and a fitting processing result is used to represent the change trend of the performance data. In this embodiment, a linear fitting operation is used as an example for description. Certainly, a specific application is not limited thereto, and the linear fitting result in this embodiment is represented in a form of a curve, The bounce count is obtained based on positive and negative values of two adjacent segments in the linear fitting result, and is used to represent a fluctuation count of a fitting processing result of receive optical power data. The deterioration level is obtained based on a quantity of segments whose statistical values are negative in all segments of the linear fitting result, and is used to represent a drop level of the linear fitting result within the preset time window, that is, a drop trend of the fitting result of the receive optical power. The rise count is obtained based on a quantity of segments whose statistical values are positive real numbers in all the segments of the linear fitting result, and is used to represent a rise level of the linear fitting result within the preset time window, that is, a rise trend of a fitting processing result of the receive optical power. The sudden change count is used to represent a quantity of times the receive optical power deviates from historical average optical power within the preset time window.

The following uses an example to describe performing a linear fitting operation on the receive optical power and obtaining each feature parameter used to represent a change trend of the performance data. No limitation is imposed thereon in an actual application process.

Figure 5:
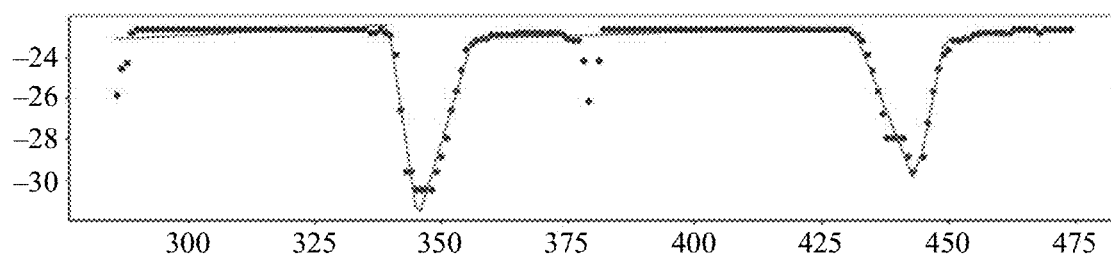
FIG. 5 is a schematic curve diagram of an IMSR fitting result according to an embodiment of this application.

An iterative segmented regression model corresponding to n unknown turning points is studied by using an iterative multi-segmented regression (IMSR) algorithm and by configuring a maximum quantity N of iterative turning points, to mine trend features of a plurality of segments between adjacent turning points. The quantity n of unknown turning points is less than or equal to the quantity N of iterative turning points. Specifically, FIG. 5 shows a fitting result of performing, by using the IMSR algorithm, a fitting operation on the receive optical power data that is within the preset time window. A dark gray point is a time sequence at original optical power, a light gray line is an IMSR fitting result, and the quantity of turning points meets n=8 (including a start point and an end point).

A turning point in each time period is $\hat{T}_i$, and a minimum value of a residual sum of squares (Sum of Squares due to Error, SSE for short) of a fitted curve corresponding to all possible quantities of turning points in 1 to N iterative turning points is calculated by using an Argmin function, for example, the following formula 1 represents a value of each turning point $T_n$ whose residual sum of squares is smallest among the n (1 to N) iterative turning points is calculated by using the Argmin function:

$$(\hat{T}_1, \ldots, \hat{T}_n) = \arg\min_{n=1 \to N} SSE(T_1, \ldots, T_n).$$

Specifically, the following formula 2 is used to obtain a calculation result of the SSE in formula 1, that is, a minimum value of a residual sum of squares of a fitting model in an interval $[T_i, T_{i+1}]$ is calculated, where both T1 and Tn are turning time points:

$$SSE(T_1, \ldots, T_n) = \min \Sigma T_i T_{i+1} SSE$$

In formula 1 and formula 2, a quantity n of iteration turning points represents all possible quantities of turning points, and an iterative segmented regression model is used to calculate a residual sum of squares of n unknown turning points, that is, a residual sum of squares of fitting models of all turning-point intervals. The residual is a difference between a corresponding position of a statistical data line and a corresponding position of a regression line, and the residual sum of squares is a sum of squares of all residuals and represents an effect of a random error. A smaller SSE value indicates a best effect of fitting the corresponding quantity n of turning points and all turning time points $(\hat{T}_1, \ldots, \hat{T}_n)$. Linear fitting can be used for fitting models within an interval $[T_i, T_{i+1}]$. Linear fitting used when the SSE value is smallest minimizes an error between a fitting model and an actual observation point.

The following formula 3 is a linear equation fitting in the iterative segmented regression model:

$$Y_t = A_i t + K_i, T_i \leq t \leq T_{i+1}.$$

A value of $Y_t$ is performance data at a time point within a corresponding interval, $A_i$ is a trend coefficient of a fitted line segment, $K_i$ is a trend intercept of the fitted line segment, data output by using the iterative segmented regression model is each turning point T and a trend coefficient $A_i$ of linear fitting that is corresponding to each segment, and T is a value of time corresponding to performance data corresponding to an iteration turning point.

Based on a fitting result obtained by performing a linear fitting operation on the receive optical power within the preset time window by using the IMSR algorithm, quantified values of the bounce count, a deterioration count, a rise count, and a sudden change count are determined, and related parameters are configured. A specific method is as follows:

Bounce count: Whether there are reverse trend coefficients in adjacent segments is determined based on a fitted trend coefficient of each segment. If a trend coefficient in an $i^{th}$ segment is a negative real number (indicating that this segment presents a drop trend), and a trend coefficient in an $(i+1)^{th}$ segment nearby is a positive real number (indicating that this segment presents a rise trend), a bounce is recorded in the two segments. Alternatively, a rise/drop trend coefficient threshold may be further set, and an identified bounce level is controlled based on a comparison between the trend coefficient in the $i^{th}$ segment and the threshold. Alternatively, a change range threshold for the receive optical power in each segment may be set. The change range threshold for the receive optical power is used to limit that only bounces that occur when a change of the receive optical power is greater than this threshold is counted. The finally calculated bounce count is an integer.

Deterioration count: A quantity of segments whose trend coefficient is a negative real number is calculated based on a fitted trend coefficient of each segment. Alternatively, a trend coefficient deterioration threshold may be further configured, and the deterioration threshold is used to count a quantity of segments whose trend coefficient is less than the deterioration threshold. Alternatively, an optical power change range threshold of each segment may be set. That is, only a quantity of segments whose optical power change is greater than the optical power change range threshold is counted.

Deterioration level: For all intervals in which deterioration exists (the same as the foregoing manner of determining a deterioration count), a trend coefficient within a preset time interval in a later period of a preset time window is output as the deterioration level.

Rise count: A quantity of segments whose trend coefficient is a positive real number is calculated based on a fitted trend coefficient of each segment. Alternatively, a trend coefficient rise threshold may be set. That is, only a quantity of segments whose trend coefficient is greater than the rise threshold is counted. Alternatively, an optical power range threshold of each segment may be set. That is, only a quantity of segments whose optical power change is greater than the optical power range threshold is counted.

Sudden change count: If two adjacent turning points in turning points are adjacent time points and an absolute value of a difference between optical power corresponding to the two points is greater than a specified deviation threshold, a sudden change is recorded. The sudden change count may be represented by using '+/−'. '+' represents a sudden rise, and '−' represents a sudden drop.

403. Identify a fault mode on an optical link based on the feature parameter.

In an embodiment of this application, the feature parameter is analyzed by using a fault mode identification algorithm, and fault identification is performed with reference to a feature parameter in an existing fault mode. Specifically, for fault mode identification in the fault mode identification algorithm, the feature parameter is matched against the fault mode identification model based on the feature parameter in an existing fault mode to determine a fault mode.

For example, the feature parameter for the receive optical power data obtained in step 402 may be a jitter level, a weak-light ratio, a strong-light ratio, a no-light ratio, a bounce count, a deterioration count, a rise count, sudden change count, and the like. The fault mode is identified based on a value of each variable included in the feature parameter of the optical power.

In an embodiment of this application, there are a plurality of network devices on the optical link. Performance data of the network devices on the optical link may be monitored in real time to quickly obtain the performance data of the network devices on the optical link. The monitoring may be real-time monitoring on data transmitted on line, or periodic monitoring on transmitted data. For example, performance data of a network device is obtained every 15 seconds. A specific implementation of the monitoring is not specifically limited herein. The performance data of the network device is obtained, and the fault mode is identified by using the fault mode identification algorithm. In this way, a difficulty, caused by a huge amount of device data, a large proportion of line faults, and a difficulty in obtaining manual troubleshooting cases, in obtaining a fault mode on an optical link in a network system is overcome, and the fault mode on the optical link can be identified accurately in a timely manner in a state in which no alert threshold needs to be set.

There are two fault mode identification manners provided in this application: In one manner, a fault tree rule is configured in advance, and a fault case is obtained by matching a feature parameter against the fault tree rule. In the other manner, a fault mode identification model corresponding to a feature parameter and a fault mode is established through data modeling, and the fault mode identification model is trained by using historical data of a fault mode including a known fault case, and the trained model is applied on line to identify a fault case on a live network.

Figure 8:
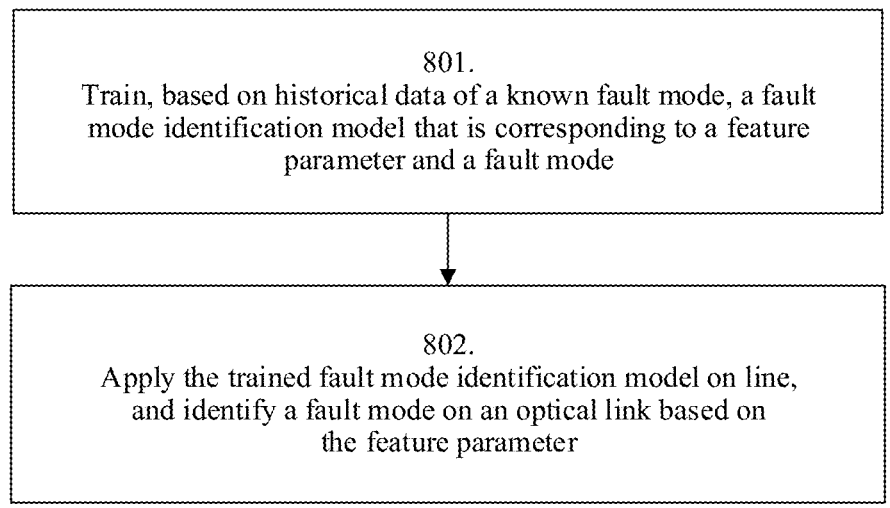
FIG. 8 is a schematic flowchart of a method for identifying an optical link fault by using historical data according to an embodiment of this application.

FIG. 8 is a schematic flowchart of a method for identifying an optical link fault by using historical data according to an embodiment of this application. Steps of the manner are as follows.

801. Train, based on historical data of a known fault mode, a fault mode identification model corresponding to a feature parameter and a fault mode.

The training a fault mode identification model is extracting the feature parameter based on the historical data of the known fault mode, and establishing the fault mode identification model based on the feature parameter. The historical data includes the feature parameter and the fault mode corresponding to the feature parameter.

The establishing the fault identification model based on the historical data is: performing training by using a classification algorithm or a regression algorithm having a determining function, and establishing the fault mode identification model. Specifically, the classification algorithm or the regression algorithm having the determining function may be a gradient boosting decision tree (GBDT), a random forest algorithm, or the like.

When the algorithm is the GBDT algorithm, a plurality of rounds of iteration are performed on the historical data, a weak classifier is generated in each round of iteration, each classifier is trained based on a residual of a classifier in a previous round, and a final total model is a model obtained by performing weighted summation on weak classifiers obtained in all the rounds of training. The weak classifier generated in each round has a loss function. Values of a negative gradient of the loss function in the current model are used as approximate values of residuals in a regression boosting algorithm to obtain a fitted regression tree. In each round of iteration, the negative gradient of the loss function in the current model is fitted, so that the loss function is as small as possible. In this way, the feature parameter of the historical data can be accurately generated by using the GBDT algorithm. The feature parameter is a feature combination corresponding to the historical data. Then the fault mode identification model is established based on the feature parameter.

When the algorithm is the random forest algorithm, K samples are selected randomly repeatedly with replacement from N training sample sets in the historical data by using a bootstrap resampling technology, to generate a new training sample set, and then K classification trees are generated based on a bootstrap sample set to form a random forest. The feature parameter is determined based on a classification tree voting score. Then, the fault mode identification model corresponding to the historical data is established based on the determined feature parameter.

802. Apply the trained fault mode identification model on line, and identify a fault mode on an optical link based on the feature parameter.

The trained model is the fault mode identification model in step 801. The fault mode identification model may be applied to step 403 in FIG. 4. In step 403, the fault mode identification model is applied to identify the feature parameter.

In an embodiment of this application, after the training, based on historical data of a known fault mode, a fault mode identification model, the method further includes: using the historical data as a training set and correspondingly storing the training set and the fault mode identification model.

In an embodiment of this application, the fault mode identification model is obtained through training based on the historical data of the known fault mode. In this case, the feature parameter to be identified by the fault mode identification model is consistent with the feature parameter determined based on the historical data by using the algorithm. Therefore, there is a correspondence between the fault mode identification model and the historical data. The fault mode identification model is obtained through training based on the historical data. Therefore, the historical data is used as a training set for training the fault mode identification model. The correspondingly storing the training set and the fault mode identification model may be storing the training set and the fault mode identification model into a storage unit having a correspondence, or may be storing the training set and the fault mode identification model after the training set and the fault mode identification model are correspondingly marked or labeled. It should be noted that the manner of correspondingly storing the training set and the fault mode identification model is not specifically limited herein.

In an embodiment of this application, the fault mode identification model is an identification model established according to a fault tree rule configured in advance based on manual experience.

Figure 7:
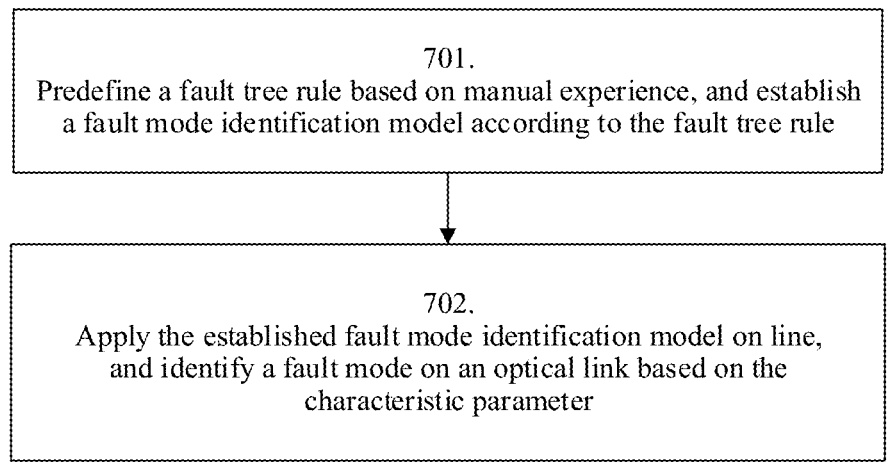
FIG. 7 is a schematic flowchart of implementing an optical link fault identification method by using a fault tree rule according to an embodiment of this application.

FIG. 7 is a schematic flowchart of a method for identifying an optical link fault by using a fault tree rule according to an embodiment of this application. Specifically, steps of implementing the manner include the following steps.

701. Predefine a fault tree rule based on manual experience, and establish a fault mode identification model according to the fault tree rule: The predefining a fault tree rule based on manual experience is defining a fault tree based on a fault mode known based on manual experience, and then defining the fault tree rule based on the fault tree; and then establish the fault mode identification model according to the fault tree rule. The fault tree is a special inverted tree-like logical causal relationship diagram. In the fault tree, event symbols, logic gate symbols, and transfer symbols are used to describe causal relationships between various events in the system. An input event of a logic gate is a "cause" of an output event, and an output event of the logic gate is a "result" of the input event.

Specifically, in this embodiment of this application, the fault tree is obtained based on a known fault mode on the optical link and manual experience by using a known fault on the optical link (for example, bending of an optical fiber on the optical link, a direct connection without an optical splitter, or a fiber cut), and the fault tree rule is formulated.

For example, bending of the optical fiber on the optical link and the direct connection without an optical splitter are known fault modes on the optical link. A comparatively obvious feature rule corresponding to bending of the optical fiber may be: Bounce count>0, deterioration count>0, rise count>0, deterioration level >preset threshold, and jitter level>specific threshold. If the extracted feature meets the foregoing rules, the extracted feature is identified as bending of the optical fiber. The specific threshold is a value preset based on manual experience. The obvious feature rule corresponding to the direct connection without an optical splitter may be: Strong-light ratio>specific threshold, rise count>0, sudden change count>0, and deterioration count=0. If the extracted feature meets this rule, the extracted feature is identified as the direct connection without an optical splitter. The specific threshold is a threshold set based on a feature of a fault case, and each fault mode has its own specific rule, and may also correspond to a different threshold based on manual experience.

702. Apply the established fault mode identification model on line, and identify a fault mode on the optical link based on the feature parameter.

The fault mode identification model may be applied to step 403 in FIG. 4. In step 403, the fault mode identification model is applied to identify the feature parameter. A specific process of identifying a fault mode on the optical link based on the feature parameter is: matching the fault tree rule against the extracted feature parameter. If the matching succeeds, the fault mode can be identified.

Figure 6:
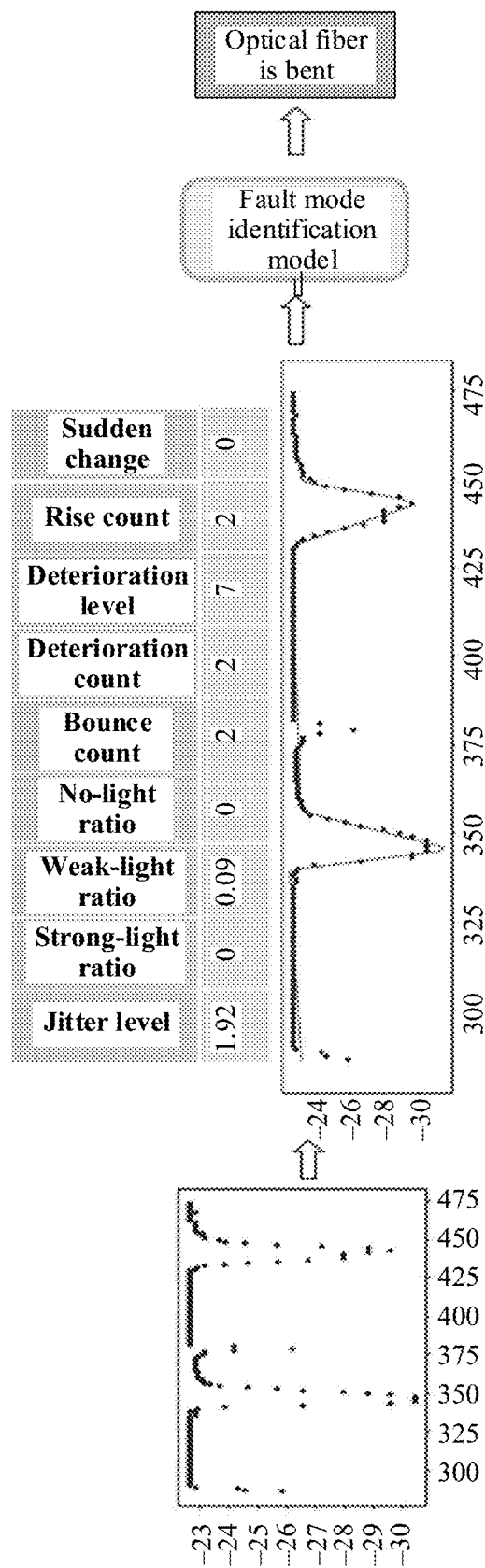
FIG. 6 is a schematic flowchart 2 of implementing an optical link fault identification method according to an embodiment of this application.

For example, as shown in FIG. 6, the performance data is a time sequence within the preset time window; and when the fault mode on the optical link is that the optical fiber is bent, the following fault tree rule is set for bending of the optical fiber based on manual experience is: The bounce count is greater than 0, the deterioration count is greater than 0, and the rise count is greater than 0, the deterioration level is greater than 0.2, and a jitter level is greater than 0.5. When the feature parameter of optical power data is: The bounce count is 2, the deterioration count is 2, the rise count is 2, the deterioration level is 2, and the jitter level is 1.92, the following may be learned based on the fault tree rule set for bending of the optical fiber: The bounce count is greater than 0, the deterioration count is greater than 0, the rise count is greater than 0, the deterioration level is greater than 0.2, and the jitter level is greater than 0.5. In this case, it is learned that the fault mode is bending of the optical fiber.

In an embodiment of this application, after the identifying a fault mode based on the feature parameter by using a fault mode identification algorithm, the method further includes: comparing the identified fault mode with an actual fault mode corresponding to the feature parameter, and if the identified fault mode is inconsistent with the actual fault mode, adding the feature parameter and the actual fault mode corresponding to the feature parameter to a training set.

Figure 9:
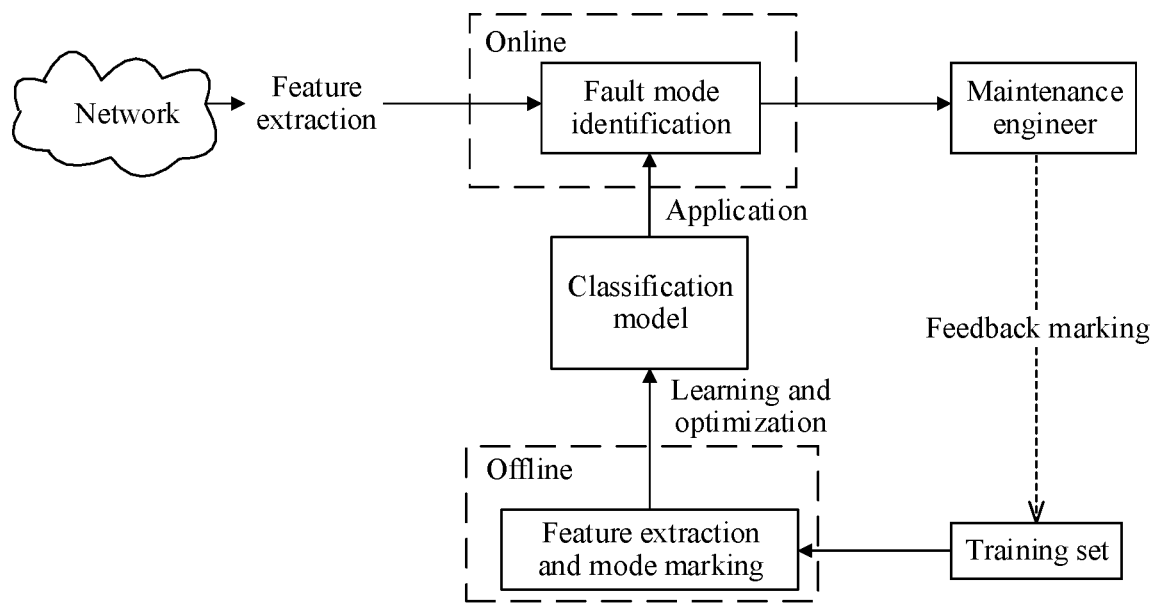
FIG. 9 is a schematic flowchart 3 of implementing an optical link fault identification method according to an embodiment of this application.

FIG. 9 is another schematic flowchart used for implementing an optical link fault identification method according to an embodiment of this application. As shown in FIG. 9, during online application, a feature parameter is extracted from collected performance data, and online identification is performed by training the fault mode identification model. A maintenance engineer may further obtain an actual fault mode through a check, feed back accuracy of the fault mode, and update the fed-back data to a training set, to improve model training accuracy. In addition, it can be learned from FIG. 9 that the fault identification model is fed back and supervised in an offline mode, and a fault is identified in an online mode. It can be learned that supervision is supervision on accuracy of the fault mode identification model.

The actual fault mode is a fault mode that is actually processed when a maintenance engineer maintains a fault mode on an optical link. The fault mode is a fault mode identified based on obtained performance data of the network device. The correspondingly stored fault mode is compared with the actual fault mode maintained by the maintenance engineer or in an actual fault mode database to obtain consistency between the fault mode and the actual fault mode, so as to ensure accuracy of an identification result of the established fault mode identification model. If the fault mode is consistent with the actual fault mode, it indicates that the identification result of the fault mode identification model is accurate. If the fault mode is inconsistent with the actual fault mode, it indicates that the identification result of the fault mode identification model is inaccurate, and the fault mode identification model needs to be re-established.

When the fault mode identification model needs to be re-established, the stored performance data corresponding to the fault mode needs to be fed back to a training set, and the training set is trained to establish a new fault mode identification model. Before the performance data is fed back, the training set includes historical data used during training of the fault mode identification model. After the performance data is fed back, the training set includes historical the fed-back performance data and data that is used during training of the fault mode identification model.

An embodiment of this application provides an optical link fault identification method. The method includes: monitoring performance data of a network device on an optical link in real time; obtaining the performance data from the network device; extracting a feature parameter of the performance data by using a feature extraction algorithm; and performing fault mode identification on the feature parameter by using a fault mode identification model, to obtain an identification result. The fault mode identification model includes two parts: an offline fault mode identification model and an online update fault mode identification model. The offline fault mode identification model is a fault mode identification model obtained by performing, before online identification, training by using historical data corresponding to an existing fault case on the optical link. The online update fault mode identification model uses, as feedback data, performance data corresponding to an incorrect fault mode identified by the fault mode identification model, updates the feedback data to a training set, performs training by using an updated training set to obtain a new fault mode identification model, and updates the new fault mode identification model to an online program or device. The online mode indicates that the system is still collecting real-time performance data without interruption, and that the fault mode identification model does not interrupt identification on the feature parameter of the collected performance data.

An embodiment of this application provides an optical link fault identification method. The method may be applied to an online big-data analysis platform or an optical link network device.

As shown in FIG. 2, when the method is applied to the online big-data analysis platform, the online big-data analysis platform is a fault identification part on the optical link, and receives KPI data transmitted by an ONU by using an OLT and a fault mode identification model of a big-data analysis training platform. The big-data analysis training platform trains a fault mode identification model based on historical performance data or a feature parameter, and the big-data analysis training platform applied to the online big-data analysis platform trains data indicating that a fault mode is identified, to obtain a new fault mode identification model, and then the new fault mode identification model is updated to the online big-data analysis platform. The ONU is connected to the OLT by using an optical fiber.

A detailed process is as follows:

The ONU sends the KPI data to the OLT. The OLT receives the KPI data and periodically sends the KPI data to the online big-data analysis platform. After performing feature parameter extraction on the received KPI data and obtaining a feature parameter of the KPI data, the online big-data analysis platform performs identification on the feature parameter of the KPI data by using the fault mode identification model; and transmits the KPI data that is after fault mode identification, to the big-data analysis training platform for training, so as to obtain a new fault mode identification model, and updates the new fault mode identification model to the online big-data analysis platform.

As shown in FIG. 3, when the method is applied to the optical link network device, the optical link network device OLT is a fault identification part on the optical link. The OLT receives the KPI data transmitted by the ONU, and transmits the KPI data to the big-data analysis training platform by using the online big-data analysis platform, so as to train a fault mode identification model. The online big-data analysis platform is configured to receive a fault mode identification result reported by the OLT, and is further configured to transmit the fault mode identification result to the big-data analysis training platform for feeding back data and update a new fault mode identification model obtained through training to the OLT. The new fault mode identification model is a new fault mode identification model trained by the big-data analysis training platform based on the fed-back data. The OLT includes a chip, and the chip is configured to identify a fault.

A detailed process is as follows:

The ONU sends KPI data to the OLT. The OLT receives the KPI data, performs fault identification on the KPI data by using a feature mining model and a fault mode identification model, and reports the fault mode to the online big-data analysis platform. The online big-data analysis platform transmits, to the big-data analysis training platform, data obtained after the mode is identified. The big-data analysis training platform transmits a new fault mode identification model to the online big-data analysis platform. The online big-data analysis platform updates the new fault mode identification model to the OLT. The OLT is connected to the ONU by using an optical fiber.

The ONU periodically the KPI data to the OLT. The OLT performs feature mining or feature extraction on the KPI data, obtains a performance feature of the KPI data, and identifies a fault based on the performance feature by using the fault mode identification model. After obtaining a diagnosis result, the OLT reports a fault mode in the diagnosis result to the online big-data analysis platform. In addition, the big-data analysis training platform periodically performs model training, and provides a model to the online big-data analysis platform. The online big-data analysis platform updates the model to the OLT for fault diagnosis.

Based on a same technical concept, an embodiment of this application further provides an optical link fault identification apparatus, to implement the foregoing method embodiments.

Figure 10:
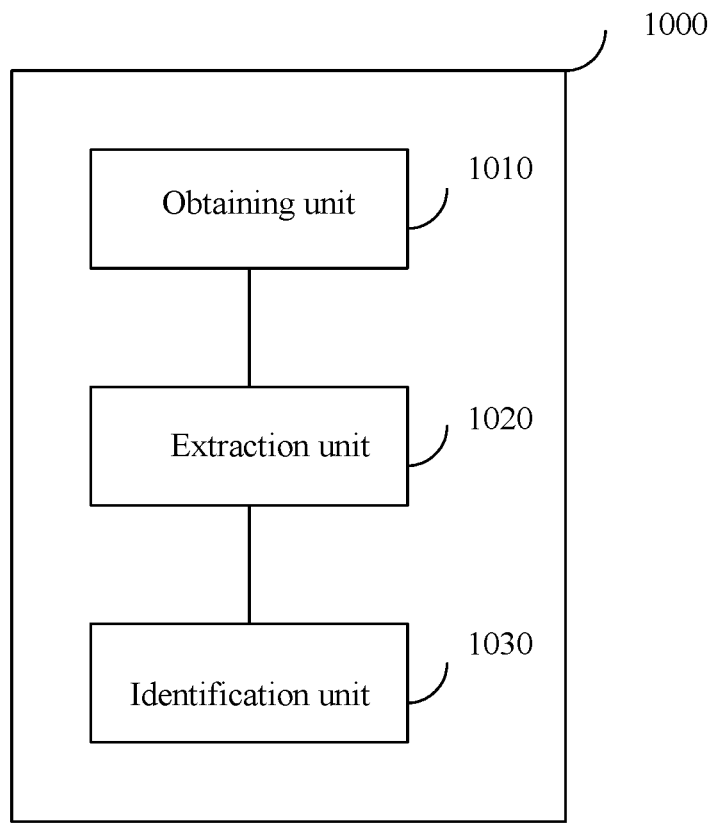
FIG. 10 is a schematic structural diagram of an optical link fault identification apparatus according to an embodiment of this application.

As shown in FIG. 10, an embodiment of this application provides an optical link fault identification apparatus 1000. The apparatus 1000 includes an obtaining unit 1010, configured to obtain performance data of a network device on an optical link that includes at least receive optical power, where the performance data obtained by the obtaining unit 1010 is a time sequence within the preset time window; an extraction unit 1020, configured to extract a feature parameter indicating a change of the performance data obtained by the obtaining unit 1010 within the preset time window; and an identification unit 1030, configured to identify a fault mode on the optical link based on the feature parameter extracted by the extraction unit 1020.

The performance data obtained by the obtaining unit 1010 further includes transmit optical power and/or an optical fiber length. The feature parameter extracted by the extraction unit 1020 includes a feature parameter used to represent an abnormality level of the performance data and/or a feature parameter used to represent a change trend of the performance data.

In addition, the identification unit 1030 may include a matching module and an output module. The matching module is configured to match the feature parameter extracted by the extraction unit 1020 against a fault mode identification model, so as to determine the fault mode. The output module is configured to output the fault mode determined by the matching module to an external optical network device.

The optical link fault identification apparatus provided in another embodiment of this application may further include a training unit, configured to train, by using historical data of a known fault mode, the fault mode identification model that is corresponding to the feature parameter and the fault mode. The historical data includes the feature parameter and the fault mode corresponding to the feature parameter.

The optical link fault identification apparatus provided in another embodiment of this application may further include a comparison unit and an addition unit. The comparison unit is configured to: compare the fault mode identified by the identification unit with an actual fault mode corresponding to the feature parameter, and output a comparison result to the addition unit; and the addition unit is configured to: receive the output result from the comparison unit, and when the fault mode identified by the identification unit is inconsistent with the actual fault mode corresponding to the feature parameter, add the feature parameter and the actual fault mode corresponding to the feature parameter to the training set.

The optical link fault identification apparatus provided in another embodiment of this application may further include an establishment unit, configured to train the training set to establish a new fault mode identification model. The training set consists of the historical data used to train the fault mode identification model, the added feature parameter, and the added actual fault mode corresponding to the feature parameter.

Based on a same technical concept, an embodiment of this application further provides an optical link fault identification system. A structure of the system may be similar to that of an existing optical link system. Both of the structures may include an optical network device, an optical line terminal, and an online big-data analysis platform. A difference between the structures lies in that the optical link fault identification apparatus mentioned in the foregoing embodiments may be disposed in the optical line terminal, for example, in a scenario b; or may be disposed in the online big-data analysis platform, for example, in a scenario a. A connection between the optical link fault identification apparatus and another unit, and a corresponding related operation are already described in the foregoing embodiments, and details are not described herein again.

Figure 11:
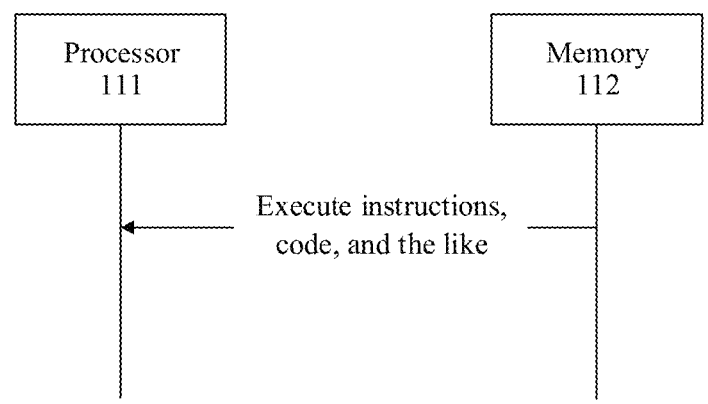
FIG. 11 is a schematic structural diagram of a data processing part in an optical link fault identification system according to an embodiment of this application.

It should be noted that the extraction unit and the identification unit that are included in the optical link fault identification apparatus provided in the embodiments of this application may be implemented by a processor. The extraction unit and the identification unit are connected to another module. As shown in FIG. 11, a processing part of an optical link fault identification system may include a processor 111 and a memory 112. The memory 112 may be configured to store indication information, and may be further configured to store code, an instruction, and the like that are executed by the processor 111.

The storage unit may be, for example, a memory. When the network device includes a storage unit, the storage unit is configured to store a computer-executable instruction, the processing unit is connected to the storage unit, and the processing unit executes the computer instruction stored in the storage unit, so that the optical link fault identification system identifies a feature parameter.

Optionally, if the optical link fault identification system consists of a plurality of network devices, optionally, if the optical link fault identification system is a chip integrating software programs of a plurality of network devices, the chip includes:

a processing module, where the processing module may be implemented by a processor, the processing circuit may execute the computer executable instruction stored in the storage unit; the storage unit may be a storage unit in the chip, for example, a register or a buffer; or the storage unit may be a storage unit located in the terminal but outside the chip, for example, a read-only memory (ROM) or another type of static storage device capable of storing static information and instructions, a random access memory (RAM), or the like.

Optionally, the storage unit is a storage unit in the chip, for example, a register or a buffer; or the storage unit may be a storage unit located in the terminal but outside the chip, for example, a read-only memory (ROM) or another type of static storage device capable of storing static information and instructions, a random access memory (RAM), or the like. The storage unit is a storage unit in the chip, for example, a register or a buffer; or the storage unit may be a storage unit located in the terminal but outside the chip, for example, a read-only memory (ROM) or another type of static storage device capable of storing static information and instructions, a random access memory (RAM), or the like.

All or some of the foregoing embodiments may be implemented by using software, hardware, firmware, or any combination thereof. When software is used to implement the embodiments, all or some of the embodiments may be implemented in the form of a computer program product. The computer program product includes one or more computer instructions. When the computer program instructions are loaded and executed on the computer, all or some of procedures or functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

Based on a same technical concept, an embodiment of this application further provides a computer-readable storage medium. The computer-readable storage medium stores a computer program, the computer program includes at least one segment of code, and the at least one segment of code may be executed by a remote server, to control an online big-data analysis platform or an OLT to implement the foregoing method embodiments.

Based on a same technical concept, an embodiment of this application further provides a computer program. When the computer program is executed by a remote server, the computer program is used to implement the foregoing method embodiments.

The program may be completely or partially stored in a storage medium that is encapsulated together with the processor, or may be partially or completely stored in a memory that is not encapsulated together with the processor.

Based on a same technical concept, an embodiment of this application further provides a processor. The processor is configured to implement the foregoing method embodiments. The processor may be a chip.

A person skilled in the art should be aware that in the foregoing one or more examples, functions described in the embodiments of this application may be implemented by using hardware, software, firmware, or any combination thereof. When software is used to implement the embodiments, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and beneficial effects of the embodiments of this application are further described in detail. It should be understood that the foregoing descriptions are merely specific implementations of the embodiments of this application, but are not intended to limit the protection scope of the embodiments of this application. Any modification, equivalent replacement, or improvement made based on technical solutions of the embodiments of this application shall fall within the protection scope of the embodiments of this application.

What is claimed is:

1. An optical link fault identification method, comprising:
    obtaining performance data from an optical network device connected to an optical link, wherein the performance data comprises receive optical power;
    extracting a feature parameter from the performance data used to determine a change of the performance data that is within a preset time window; and
    identifying a fault mode on the optical link based on the feature parameter, wherein identifying the fault mode on the optical link based on the feature parameter comprises:
        matching the feature parameter against a fault mode identification model to determine the fault mode, wherein the fault mode identification model is trained using historical data, wherein the historical data comprises a set of feature parameters and a set of fault modes, wherein each feature parameter in the set of feature parameters corresponds to a fault mode in the set of fault modes; and
        comparing the fault mode with an actual fault mode corresponding to the feature parameter, and in response to the identified fault mode being inconsistent with the actual fault mode, adding the feature parameter and the actual fault mode corresponding to the feature parameter to a training set of the fault mode identification model.

2. The method according to claim 1, wherein the performance data further comprises transmit optical power.

3. The method according to claim 1, wherein the performance data further comprises an optical fiber length.

4. The method according to claim 1, wherein the feature parameter comprises a feature parameter used to represent an abnormality level of the performance data.

5. The method according to claim 4, wherein the feature parameter used to represent the abnormality level of the performance data comprises one or any combination of the following parameters:
    a jitter level that is a level of a random change of the receive optical power within the preset time window;
    a weak-light ratio that is a ratio of a duration of weak light in the receive optical power to total duration of the preset time window;
    a strong-light ratio that is a ratio of a duration of strong light in the receive optical power to the total duration of the preset time window; or
    a no-light ratio that is a ratio of a duration of no light in the receive optical power to the total duration of the preset time window.

6. The method according to claim 1, wherein the feature parameter comprises a feature parameter used to represent a change trend of the performance data.

7. The method according to claim 6, wherein the feature parameter used to represent the change trend of the performance data comprises one or any combination of the following parameters:
    a bounce count, used to represent a fluctuation count of a fitting processing result of the receive optical power;
    a deterioration level, used to represent a drop trend of the fitting processing result of the receive optical power;
    a rise count, used to represent a rise trend of the fitting processing result of the receive optical power; or a sudden change count, used to represent a quantity of times the receive optical power deviates from a historical average optical power within the preset time window.

8. The method according to claim 1, wherein after the adding the feature parameter and the actual fault mode corresponding to the feature parameter to the training set, the method further comprises:

performing training based on the training set to establish a new fault mode identification model, wherein the training set consists of the historical data used to train the fault mode identification model, the added feature parameter, and the added actual fault mode corresponding to the feature parameter.

9. An optical link fault identification apparatus, comprising:

a non-transitory computer readable medium storing computer-executable instructions; and a processor, wherein the processor is configured to retrieve and execute the computer-executable instructions to cause the apparatus to perform the following operations:

obtaining performance data from an optical network device connected to an optical link, wherein the performance data comprises receive optical power;

extracting a feature parameter from the performance data used to determine a change of the performance data that is within a preset time window; and identifying a fault mode on the optical link based on the feature parameter, wherein identifying the fault mode on the optical link based on the feature parameter comprises:

matching the feature parameter against a fault mode identification model to determine the fault mode, wherein the fault mode identification model is trained using historical data, wherein the historical data comprises a set of feature parameters and a set of fault modes, wherein each feature parameter in the set of feature parameters corresponds to a fault mode in the set of fault modes; and comparing the fault mode with an actual fault mode corresponding to the feature parameter, and in response to the identified fault mode being inconsistent with the actual fault mode, adding the feature parameter and the actual fault mode corresponding to the feature parameter to a training set of the fault mode identification model.

10. The apparatus according to claim 9, wherein the performance data further comprises transmit optical power and/or an optical fiber length.

11. The apparatus according to claim 9, wherein the feature parameter comprises a feature parameter used to represent an abnormality level of the performance data and/or a feature parameter used to represent a change trend of the performance data.

12. The apparatus according to claim 11, wherein the feature parameter used to represent the abnormality level of the performance data comprises one or any combination of the following parameters:

a jitter level that is a level of a random change of the receive optical power within the preset time window;

a weak-light ratio that is a ratio of a duration of weak light in the receive optical power to total duration of the preset time window;

a strong-light ratio that is a ratio of a duration of strong light in the receive optical power to the total duration of the preset time window; or a no-light ratio that is a ratio of a duration of no light in the receive optical power to the total duration of the preset time window.

13. The apparatus according to claim 11, wherein the feature parameter used to represent the change trend of the performance data comprises one or any combination of the following parameters:

a bounce count, used to represent a fluctuation count of a fitting processing result of the receive optical power;

a deterioration level, used to represent a drop trend of the fitting processing result of the receive optical power;

a rise count, used to represent a rise trend of the fitting processing result of the receive optical power; or a sudden change count, used to represent a quantity of times the receive optical power deviates from a historical average optical power within the preset time window.

14. An optical link fault identification system, comprising:

an optical link fault identification apparatus; and an optical network device connected to the optical link fault identification apparatus by an optical link, wherein the optical link network device is configured to send performance data of the optical link to the optical link fault identification apparatus; and wherein the optical link fault identification apparatus is configured to:

receive the performance data of the optical link from the optical network device, wherein the performance data comprises receive optical power, extract a feature parameter from the performance data used to determine a change of the performance data that is within a preset time window, and identify a fault mode on the optical link based on the feature parameter, wherein identifying the fault mode on the optical link based on the feature parameter comprises:

matching the feature parameter against a fault mode identification model to determine the fault mode, wherein the fault mode identification model is trained using historical data, wherein the historical data comprises a set of feature parameters and a set of fault modes, wherein each feature parameter in the set of feature parameters corresponds to a fault mode in the set of fault modes; and comparing the fault mode with an actual fault mode corresponding to the feature parameter, and in response to the identified fault mode being inconsistent with the actual fault mode, adding the feature parameter and the actual fault mode corresponding to the feature parameter to a training set of the fault mode identification model.

* * * * *